Oct. 18, 1938.　　　　F. F. GORDON　　　　2,133,291

MANUFACTURE OF COMPOUND METAL BODIES

Filed Aug. 16, 1934

Inventor
FREDERICK F. GORDON,
By
Toulmin & Toulmin
Attorneys

Patented Oct. 18, 1938

2,133,291

UNITED STATES PATENT OFFICE 2,133,291

MANUFACTURE OF COMPOUND METAL BODIES

Frederick Felix Gordon, Sheffield, England

Application August 16, 1934, Serial No. 740,184
In Great Britain April 12, 1934

9 Claims. (Cl. 29—189)

This invention relates to the manufacture of compound metal bodies, i. e., bodies consisting of layers of metals bonded (i. e. united) together by placing a bonding material between the surfaces to be united and effecting the union of said surfaces by means of heat or heat and pressure. The invention is applicable to the bonding one to another of ordinary irons and steels and alloyed irons and steels to form compound plates, sheets, slabs, billets, ingots, tubes or other products and is particularly useful for the bonding of such types of metals as low and high carbon steels, high speed steels and corrosion resisting (for example stainless and rustless) irons and steels, but its application is not limited thereto as it may be used for many other combinations of metals and alloys.

The object of the present invention is to provide an improved method of manufacture involving the use of a bonding material which will possess such mechanical strength that the compound body as a whole will be "workable", i. e. capable of being satisfactorily subjected to heat treatment, such as annealing, hardening or tempering and mechanical treatment such as rolling, forging, hammering or pressing or other similar operations to which metals and alloys may be subjected in the course of manufacture from blanks to semi-finished and finished products.

According to this invention the bonding material must be one which must melt or be brought to a condition suitable for forming a satisfactory bond at a temperature which does not exceed 1400° C. and is not so high as to destroy the advantageous characteristics of or otherwise injure, the metals of the bodies to be bonded but which will not melt at the temperatures used for the subsequent hot working of the compound body, e. g., not below 1100° C.

As a result of my experiments I find that a bonding material consisting of the metal manganese alone or of a metal alloy or mixture of metals containing manganese as its essential and controlling constituent possesses the foregoing characteristics.

According to the present invention therefore, the process for the manufacture of compound metal bodies with the use of an intermediate metallic bonding material at the interfaces of the bodies and the application of heat, or heat and pressure, is characterized in that manganese is used as the essential and controlling influence of the bonding material.

The manganese may be used alone or along with one or more of the metals nickel, iron, cobalt and chromium.

When manganese is used in the unalloyed state with nickel, iron, cobalt or chromium or any combination of these four latter metals, I get more satisfactory results with a range of mixtures containing from about 98% manganese down to a mixture containing about 10% of manganese. This range of proportions is satisfactory for most working conditions. With a mixture having a somewhat lower percentage of manganese than 10% of the total it is still possible to obtain a bond which is sufficiently workable to satisfy certain of the practical requirements referred to although not capable of being worked to the same extent as a mixture containing higher percentages of manganese.

The most generally useful range, however, is that which has a manganese content of 90% down to 20%, the balance being one or more of the metals nickel, iron, cobalt or chromium or any combination thereof.

By way of illustration the following are given as a few examples of many compositions of bonding material which may be used according to this invention:—

Manganese nickel

| | Percent | | Percent | | Percent |
|---|---|---|---|---|---|
| Manganese | 10 to 30 | Manganese | 30 to 60 | Manganese | 60 to 99 |
| Nickel | 70 to 90 | Nickel | 40 to 70 | Nickel | 1 to 40 |

Manganese iron

| | Percent | | Percent | | Percent |
|---|---|---|---|---|---|
| Manganese | 10 to 30 | Manganese | 30 to 60 | Manganese | 60 to 99 |
| Iron | 70 to 90 | Iron | 40 to 70 | Iron | 1 to 40 |

Manganese cobalt

| | Percent | | Percent | | Percent |
|---|---|---|---|---|---|
| Manganese | 10 to 30 | Manganese | 30 to 60 | Manganese | 60 to 99 |
| Cobalt | 70 to 90 | Cobalt | 40 to 70 | Cobalt | 1 to 40 |

Manganese chromium

| | Percent | | Percent | | Percent |
|---|---|---|---|---|---|
| Manganese | 20 to 40 | Manganese | 35 to 95 | Manganese | 50 to 95 |
| Chromium | 60 to 80 | Chromium | 5 to 65 | Chromium | 5 to 50 |
| Manganese | 40 to 95 | Manganese | 10 to 30 | | |
| Chromium | 5 to 60 | Chromium | 70 to 90 | | |

Manganese nickel iron

| | Percent | | Percent | | Percent |
|---|---|---|---|---|---|
| Manganese | 11 to 30 | Manganese | 11 to 30 | Manganese | 15 to 25 |
| Nickel | 40 to 72 | Nickel | 15 to 30 | Nickel | 15 to 25 |
| Iron | 15 to 30 | Iron | 40 to 72 | Iron | 50 to 70 |
| Manganese | 20 to 40 | Manganese | 40 to 80 | Manganese | 40 to 80 |
| Nickel | 20 to 40 | Nickel | 5 to 30 | Nickel | 15 to 30 |
| Iron | 20 to 40 | Iron | 15 to 30 | Iron | 5 to 30 |
| Manganese | 40 to 80 | Manganese | 50 to 70 | | |
| Nickel | 10 to 30 | Nickel | 15 to 25 | | |
| Iron | 10 to 30 | Iron | 15 to 25 | | |

Manganese nickel cobalt

| Percent | Percent | Percent |
|---|---|---|
| Manganese... 11 to 96 | Manganese... 20 to 40 | Manganese... 30 to 50 |
| Nickel...... 2 to 45 | Nickel...... 30 to 40 | Nickel...... 10 to 60 |
| Cobalt...... 2 to 44 | Cobalt...... 30 to 40 | Cobalt...... 10 to 60 |

| Percent | Percent |
|---|---|
| Manganese... 50 to 70 | Manganese.. 70 to 95 |
| Nickel...... 20 to 30 | Nickel...... 3 to 28 |
| Cobalt...... 10 to 30 | Cobalt...... 2 to 27 |

Manganese nickel chromium

| Percent | Percent | Percent |
|---|---|---|
| Manganese... 11 to 30 | Manganese... 30 to 40 | Manganese.. 40 to 60 |
| Nickel...... 35 to 45 | Nickel...... 30 to 35 | Nickel...... 2 to 30 |
| Chromium... 35 to 44 | Chromium... 30 to 35 | Chromium... 10 to 30 |

| Percent | Percent | Percent |
|---|---|---|
| Manganese... 40 to 60 | Manganese... 50 to 80 | Manganese.. 10 to 30 |
| Nickel...... 10 to 30 | Nickel...... 5 to 25 | Nickel...... 30 to 60 |
| Chromium... 2 to 30 | Chromium... 5 to 25 | Chromium... 30 to 60 |

Manganese iron cobalt

| Percent | Percent | Percent |
|---|---|---|
| Manganese... 10 to 30 | Manganese.. 10 to 40 | Manganese.. 30 to 60 |
| Iron......... 35 to 45 | Iron......... 30 to 45 | Iron......... 2 to 38 |
| Cobalt...... 35 to 45 | Cobalt...... 30 to 45 | Cobalt...... 2 to 38 |

| Percent | Percent | Percent |
|---|---|---|
| Manganese... 60 to 80 | Manganese... 80 to 98 | Manganese.. 80 to 98 |
| Iron......... 2 to 20 | Iron......... 1 to 16 | Iron......... 1 to 4 |
| Cobalt...... 2 to 20 | Cobalt...... 1 to 4 | Cobalt...... 1 to 16 |

Manganese iron chromium

| Percent | Percent | Percent |
|---|---|---|
| Manganese... 10 to 30 | Manganese.. 10 to 20 | Manganese.. 30 to 60 |
| Iron......... 35 to 45 | Iron......... 30 to 55 | Iron......... 2 to 38 |
| Chromium... 35 to 45 | Chromium... 30 to 55 | Chromium... 2 to 38 |

| Percent | Percent | Percent |
|---|---|---|
| Manganese... 60 to 80 | Manganese... 80 to 98 | Manganese.. 80 to 98 |
| Iron......... 2 to 20 | Iron......... 1 to 16 | Iron......... 1 to 4 |
| Chromium... 2 to 20 | Chromium... 1 to 4 | Chromium... 1 to 16 |

Manganese cobalt chromium

| Percent | Percent | Percent |
|---|---|---|
| Manganese... 10 to 40 | Manganese... 40 to 80 | Manganese.. 80 to 98 |
| Cobalt...... 30 to 45 | Cobalt...... 10 to 30 | Cobalt...... 1 to 10 |
| Chromium... 30 to 45 | Chromium... 10 to 30 | Chromium... 1 to 10 |

| Percent | Percent |
|---|---|
| Manganese... 18 to 88 | Manganese... 18 to 88 |
| Cobalt...... 2 to 72 | Cobalt...... 10 to 80 |
| Chromium... 10 to 80 | Chromium... 2 to 72 |

Manganese iron cobalt chromium

| Percent | Percent | Percent |
|---|---|---|
| Manganese... 10 to 97 | Manganese.. 10 to 55 | Manganese.. 10 to 55 |
| Iron......... 1 to 30 | Iron......... 5 to 60 | Iron......... 15 to 28 |
| Cobalt...... 1 to 30 | Cobalt...... 15 to 28 | Cobalt...... 5 to 60 |
| Chromium... 1 to 30 | Chromium... 15 to 27 | Chromium... 15 to 27 |

| Percent |
|---|
| Manganese... 10 to 55 |
| Iron......... 15 to 28 |
| Cobalt...... 15 to 27 |
| Chromium... 15 to 60 |

Manganese nickel cobalt chromium

| Percent | Percent | Percent |
|---|---|---|
| Manganese... 10 to 97 | Manganese.. 10 to 55 | Manganese.. 10 to 55 |
| Nickel....... 1 to 30 | Nickel....... 5 to 60 | Nickel....... 15 to 28 |
| Cobalt...... 1 to 30 | Cobalt...... 15 to 28 | Cobalt...... 5 to 60 |
| Chromium... 1 to 30 | Chromium... 15 to 27 | Chromium... 15 to 27 |

| Percent |
|---|
| Manganese... 10 to 55 |
| Nickel....... 15 to 28 |
| Cobalt...... 15 to 27 |
| Chromium... 15 to 60 |

Manganese nickel cobalt iron

| Percent | Percent | Percent |
|---|---|---|
| Manganese... 10 to 97 | Manganese... 10 to 55 | Manganese.. 10 to 55 |
| Nickel....... 1 to 30 | Nickel....... 5 to 60 | Nickel....... 15 to 28 |
| Cobalt...... 1 to 30 | Cobalt...... 15 to 28 | Cobalt...... 5 to 60 |
| Iron......... 1 to 30 | Iron......... 15 to 27 | Iron......... 15 to 27 |

| Percent |
|---|
| Manganese... 10 to 55 |
| Nickel....... 15 to 28 |
| Cobalt...... 15 to 27 |
| Iron......... 15 to 60 |

Manganese nickel chromium iron

| Percent | Percent | Percent |
|---|---|---|
| Manganese... 10 to 97 | Manganese... 10 to 55 | Manganese.. 10 to 55 |
| Nickel....... 1 to 30 | Nickel....... 5 to 60 | Nickel....... 15 to 28 |
| Chromium... 1 to 30 | Chromium... 15 to 28 | Chromium... 5 to 60 |
| Iron......... 1 to 30 | Iron......... 15 to 27 | Iron......... 15 to 27 |

| Percent |
|---|
| Manganese... 10 to 55 |
| Nickel....... 15 to 28 |
| Chromium... 15 to 27 |
| Iron......... 5 to 60 |

Manganese nickel chromium iron cobalt

| Percent | Percent | Percent |
|---|---|---|
| Manganese- 10 to 96 | Manganese.. 10 to 96 | Manganese.. 10 to 96 |
| Nickel...... 1 to 22½ | Nickel...... 1 to 80 | Nickel...... 1 to 4 |
| Chromium.. 1 to 22½ | Chromium.. 1 to 4 | Chromium.. 1 to 80 |
| Iron......... 1 to 22½ | Iron......... 1 to 3 | Iron......... 1 to 3 |
| Cobalt...... 1 to 22½ | Cobalt...... 1 to 3 | Cobalt...... 1 to 3 |

| Percent | Percent |
|---|---|
| Manganese- 10 to 96 | Manganese.. 10 to 96 |
| Nickel...... 1 to 4 | Nickel...... 1 to 4 |
| Chromium.. 1 to 3 | Chromium.. 1 to 3 |
| Iron......... 1 to 80 | Iron......... 1 to 3 |
| Cobalt...... 1 to 3 | Cobalt...... 1 to 80 |

The substances usually occurring as impurities in the metal or metals of the bonding material may be present.

The bonding material is preferably in powdered form, but it may be in granular or other solid form, e. g. in sheet or strip form or a combination of powered form and sheet or strip form.

It is to be understood, however, that the manganese being the controlling element, a definite amount of at least 15% of manganese must be used when the bonding material consists of manganese and one or more of the other metals mentioned and is used in solid form in which the metals have previously been melted together. Preferably, however, the manganese, is employed either wholly or in part as free and uncombined (unalloyed) metal when used with one or more of the other metals.

With the bonding material a flux may be used such as borax, sodium or potassium fluoride or carbonate, resin, ammonium and zinc chlorides or any suitable mixture of these.

The bonding material previously referred to is with the addition of about 8% of anhydrous borax or potassium fluoride and borax as a flux, found to be suitable for bonding corrosion resisting irons and steels and mild steels and irons, high carbon steels and corrosion resisting steels and irons; manganese steels and corrosion resisting irons and steels; and high speed steels and mild steels and irons.

The invention is applicable to the bonding of many types and compositions of irons and steels of which the following are typical examples:—

Corrosion resisting steels
 Corrosion resisting irons
 High chromium nickel steels
 Manganese steels
 Nickel steels
 Ordinary alloy irons
 Irons
 Silico Manganese steels
 High speed steels
 High chromium steels
 Mild steels
 Ordinary carbon steels
 Chromium steels
 Ordinary alloy steels
 Nickel chromium steels Where the compound metal body is, after bonding to be worked as by rolling, forging, swaging, hammering, pressing or other mechanical operation, the said body should be pressed whilst hot to ensure that the compound metal body will possess such mechanical strength as to subsequently better withstand the stresses due to these aforesaid mechanical operations without risk of the bonded layers coming apart.

Where it is not convenient or desirable to apply the pressure whilst the compound body is still hot from the bonding operation, the pressure may be applied at any time afterwards by again reheating the compound body, provided the compound body is reheated to approximately the same temperature as was employed in the initial heating for bonding.

A sufficient quantity of the bonding material is used to provide a layer between the surfaces to be united and to substantially fill any spaces between the said surfaces.

If, for example, it is desired to bond a thin plate of corrosion resisting steel (high chromium or high chromium nickel steel) to a mild steel slab, the invention is carried out as follows:— If the surfaces to be united are not clean they are preferably cleaned by pickling, sandblasting or grinding, or otherwise. Between the said surfaces the selected bonding material, for example manganese, together with a flux, for example borax, is placed. The whole is then heated until it attains a temperature of about 1325° C., at which temperature the first stage of the bonding process is effected and the whole is then subjected to pressure which completes the bonding. Whilst still sufficiently hot from the bonding process the composite slab may be reduced in cross sectional area or thickness by rolling or by some other known process or it may be allowed to cool and be subsequently re-heated to a suitable temperature for such reduction.

When bonding high carbon steels to low carbon steels a temperature of about 1260° C. is suitable, with a bonding material composed of 80% manganese and 20% of nickel. For bonding high speed steels to ordinary steels a temperature of about 1320° C. is suitable with a bonding material composed of 50% of manganese, 20% of iron and 30% of nickel. For bonding corrosion resisting (for example stainless and rustless) irons or steels to ordinary irons and steels a temperature of about 1350° C., is suitable with a bonding material composed of 50% manganese, 17% iron, 17% cobalt and 16% chromium. In each of these three examples, a flux of anhydrous borax equal to about 8% of the total weight of the metallic bonding material is suitable.

I wish it to be understood that the three foregoing examples are given by way of illustration only and that the bonding materials referred to may in each case be varied over a wide range.

Compound metal sheets, plates, slabs or billets bonded according to my invention can be treated by subsequent processes substantially in the same manner as a single piece.

Whilst mechanical mixtures of the metals forming the bonding material may be made by taking a quantity of each of the several metals in powder form and then mixing them together it is obvious that in some cases the several metals forming the bonding material could be melted together and then afterwards reduced to powder or be granulated or take the form of turnings or be formed into sheets, strips or plates and used as such for the bonding material.

Various methods of carrying out my invention will now be described with reference to the accompanying drawing in which.

Figure 1:
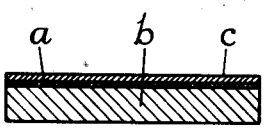
Figs. 1 to 7 illustrate the bonding of slabs and sheets.
Figure 2:
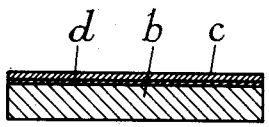
Figure 3:
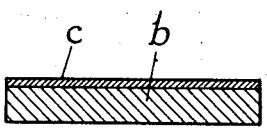

In Fig. 1 a layer of powdered bonding material *a* mixed with a flux is first placed over the surface of one side of a mild steel slab *b* and then a sheet *d* of corrosion resisting steel is applied, the composite body is then heated in a furnace and pressed as hereinbefore described, resulting in the compound slab shown in Fig. 3 which can be rolled into thin sheets. Alternatively as shown in Fig. 2 a sheet *d* of bonding material coated with a flux is used instead of a powdered bonding material between a mild steel slab *b*, and a sheet *c* of corrosion resisting steel, the composite slab after heating and pressing resulting again in a compound slab as shown in Fig. 3.

Figure 4:

In a further embodiment of this invention as shown in Fig. 4 two slabs or sheets *e* of metal having clean surfaces (which surfaces may be made clean by suitable treatment) are placed together with a separating or non-bonding material applied between their juxtaposed surfaces *f*. The edges of the slabs or sheets are then sealed at *g*, for example, by welding, and to each of the remote surfaces there is applied the bonding material *a* and a metal sheet, slab or body *h* whose contacting surface is preferably cleaned. The resultant compound body is then heated as before to bond the sheets *e* to the adjacent slabs *h* and pressure is preferably applied to the hot mass, which may then be rolled or forged immediately, or after cooling and reheating. Thereafter the mass is separated at the juxtaposed and non-bonded surfaces *f* by removing the welded or sealed edges *g*, for example by shearing, which results in two separate compound bodies.

Figure 5:
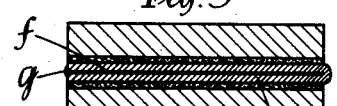

As depicted in Fig. 5*a* a similar result may be obtained by bending a single sheet or slab *j* upon itself and applying a non-bonding or separating material between the adjacent surfaces *f* and welding the exposed edges and then proceeding as immediately before described.

Figure 6:
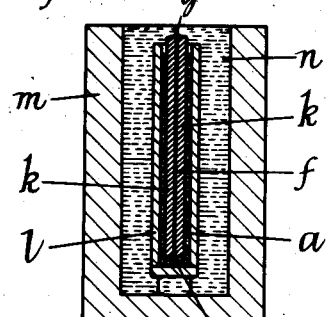

Figure 6 shows another method of producing a compound body by first placing together two metal bodies *k* with a separating material between their juxtaposed preferably cleaned surfaces *f* and sealing the edges at *g* as before described, then placing the assembly so defined in, but spaced apart from, a hollow body *l* containing at least sufficient of the powdered bonding material *a* to fill, when melted, the space between the bodies and then placing the whole in a mould *m* and casting molten metal completely about the whole so as to heat and melt the bonding material, and whereby the cast metal *n* becomes part of the resultant compound body, said body being adapted to be divided at the sealed edges *g* of the non-bonded surfaces to form a plurality of compound bodies.

Figure 7:
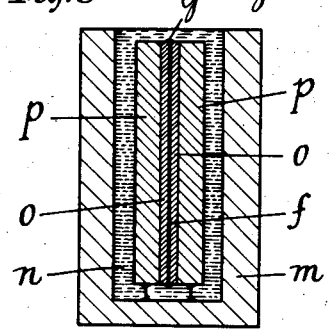

Still another method of producing a compound body is shown in Fig. 7 by first placing together two metal bodies *o* with a separating material between their juxtaposed and preferably cleaned surfaces *f* and sealing the edges thereof at *g* as before described, then placing or applying to their remote surfaces the bonding material and a metal sheet, slab or body *p*, heating the mass to melt the bonding material and applying pressure to the hot mass, and subsequently placing in a mould *m* but spaced apart therefrom, the resultant compound body whose remote surfaces are preferably cleaned and casting molten metal about the same, whereby the cast metal *n* becomes part of the resultant compound body, said body adapted to be divided at the sealed edges *g* of the non-bonded surfaces to form a plurality of compound bodies.

Figure 8:
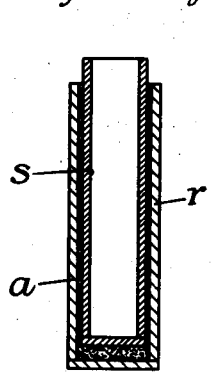
Figs. 8, 9, 10 and 11 illustrate the bonding of tubes.
Figure 9:
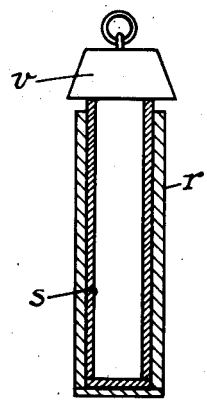
Figure 10:
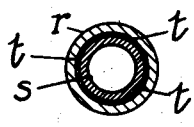

Compound tubes may be made according to my invention in a similar manner. For example as shown in Figs. 8, 9 and 10 an outer tube *r* of mild steel is sealed at one end and a quantity of the powdered bonding material a and a flux are placed therein. There is then inserted an inner tube s of corrosion resisting steel or iron also with one end sealed the outer diameter of the inner tube being such as to leave an annular space between the two tubes. Strips of metal or wires t (Fig. 10) may be placed in the space between the two tubes to ensure that the inner tube is centrally disposed. The assembly is then heated until the bonding material melts and completely fills the said space. For this purpose the assembly may be placed in a furnace or in an ingot mould and in the latter case liquid steel cast around the assembly of tubes, the heat of the liquid steel causing the bonding material to melt and the cast metal forming part of the compound tube. Means such as a weight v or a spring may be arranged to cause the inner tube s to sink and thereby cause the bonding material to rise between the two tubes and bond them as shown in Fig. 9. The inner tube s is preferably somewhat longer than the outside tube r so that any excess of bonding material does not flow into the inside of the inner tube. The compound tube is then reduced in cross section to the requisite size in known manner or if it has been allowed to cool, is reheated subsequently and reduced in cross section.

Figure 11:
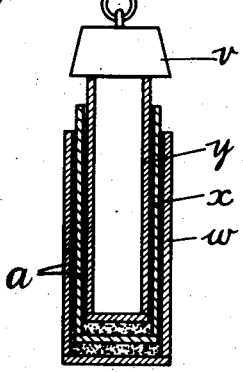

Tubes lined both exteriorly and interiorly can be made in similar manner and as shown in Fig. 11 by forming an assembly of three concentrically arranged tubes w, x and y with the bonding material a placed between the outer and middle tubes w and x, and middle and inner tubes x and y, the outer and inner tubes w and y being of lining material, and then heating the whole assembly to melt the bonding material.

Figure 12:
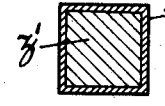
Figs. 12, 13 and 14 show cross sections of compound bars.
Figure 13:
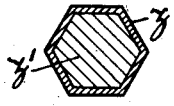
Figure 14:
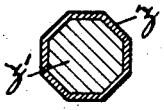

Compound rods or bars of various cross sections and examples of which are depicted in Figs. 12, 13 and 14 may be made in the manner above described. For example an outer tube z of any desired cross section may be of corrosion resisting iron or steel and the insert of similar but smaller cross section may be a solid bar z' of mild or other steel.

In the case of compound tubes and rods, it is unnecessary to apply pressure after the bonding to enable the tube or rod to be mechanically worked without risk of the layers coming apart, for the pressure exerted during the usual hot mechanical working of a tube or rod tends to consolidate the bond.

What I claim and desire to secure by Letters Patent is:—

1. A process for the manufacture of a compound metal body capable of being subsequently worked, which consists in interposing throughout the interfaces of a plurality of metal bodies to be united, a metallic bonding material having a lower melting point than that of said bodies and comprising only manganese and an element selected from the group consisting of nickel, cobalt, chromium and iron, and heating the assembly substantially uniformly throughout to a temperature which is sufficient to cause the bonding material to effect a satisfactory bonding of the bodies but is below the melting points of the bodies.

2. A process for the manufacture of a compound metal body capable of being subsequently worked, which consists in interposing throughout the interfaces of a plurality of metal bodies to be united, a metallic bonding material having a lower melting point than that of said bodies and comprising only manganese and an element selected from the group consisting of nickel, cobalt, chromium and iron, heating the assembly substantially uniformly throughout to a temperature which is sufficient to cause the bonding material to effect a satisfactory bonding of the bodies but is below the melting points of the bodies, and applying pressure to the interfaces of the bodies while hot.

3. A process for the manufacture of a compound metal body according to claim 2, characterized by the step of subjecting the resultant compound metal body as a whole to heat treatment and mechanical treatment.

4. A process for the manufacture of a compound metal body according to claim 1, characterized in that a flux is added to the bonding material.

5. A process for the manufacture of a compound metal body according to claim 2, characterized in that the proportion of manganese in the bonding material is between 15% and 98%.

6. A process for the manufacture of a compound metal body from inner and outer bodies, which compound metal body is capable of being subsequently worked, which consists in interposing between the adjacent outer and inner surfaces, respectively, of the inner and outer bodies to be united, a metallic bonding material having a lower melting point than that of said bodies and comprising only manganese and an element selected from the group consisting of nickel, cobalt, chromium and iron, and heating the assembly substantially uniformly throughout to a temperature which is sufficient to cause the bonding material to effect a satisfactory bonding of the bodies, but is below the melting points of the bodies.

7. A process for the manufacture of a compound metal body capable of being subsequently worked, which consists in placing a separating material between the juxtapositioned faces of two metal bodies, applying to each of the remote faces of said bodies a further metal body and interposing throughout the interfaces of the initial bodies and the further bodies a metallic bonding material having a lower melting point than that of said bodies and comprising only manganese and an element selected from the group consisting of nickel, cobalt, chromium and iron, and heating the assembly substantially uniformly throughout to a temperature which is sufficient to cause the bonding material to effect a satisfactory bonding of the bodies but is below the melting points of the bodies.

8. A process for the manufacture of a compound metal body capable of being subsequently worked, which consists in placing a separating material between the juxtapositioned faces of two metal bodies, applying to each of the remote faces of said bodies a further metal body and interposing throughout the interfaces of the initial bodies and the further bodies a metallic bonding material having a lower melting point than that of said bodies and comprising only manganese and an element selected from the group consisting of nickel, cobalt, chromium and iron, heating the assembly substantially uniformly throughout to a temperature which is sufficient to cause the bonding material to effect a satisfactory bonding of the bodies but is below the melting points of the bodies, and applying pressure to the interfaces of the resultant compound metal body while hot.

9. A process for the manufacture of a compound metal body capable of being subsequently worked, which consists in interposing throughout the interfaces of a plurality of metal bodies to be united, a metallic bonding material having a lower melting point than that of said bodies and comprising only manganese and a plurality of elements selected from the group consisting of nickel, cobalt, chromium and iron, and heating the assembly substantially uniformly throughout to a temperature which is sufficient to cause the bonding material to effect a satisfactory bonding of the bodies, but is below the melting points of the bodies.

FREDERICK FELIX GORDON.